(12) United States Patent
Peter

(10) Patent No.: US 10,149,426 B2
(45) Date of Patent: Dec. 11, 2018

(54) SEED FIRMER LIFE EXTENDER

(71) Applicant: FloRite, Inc., Hicksville, OH (US)

(72) Inventor: Jeffrey J. Peter, Hicksville, OH (US)

(73) Assignee: FloRite, Inc., Hicksville, OH (US)

(*) Notice: Subject to any disclaimer, the term of this patent is extended or adjusted under 35 U.S.C. 154(b) by 0 days.

(21) Appl. No.: 15/431,847

(22) Filed: Feb. 14, 2017

(65) Prior Publication Data

US 2017/0332545 A1 Nov. 23, 2017

Related U.S. Application Data

(60) Division of application No. 14/012,246, filed on Nov. 4, 2013, now Pat. No. 9,565,797, which is a continuation-in-part of application No. 13/862,698, filed on Apr. 13, 2013, now abandoned.

(60) Provisional application No. 61/642,004, filed on May 3, 2012.

(51) Int. Cl.
*A01C 7/08* (2006.01)
*A01C 7/06* (2006.01)
*A01C 5/06* (2006.01)

(52) U.S. Cl.
CPC ............... *A01C 7/08* (2013.01); *A01C 5/068* (2013.01); *A01C 7/06* (2013.01)

(58) Field of Classification Search
CPC ........... A01C 5/068; A01C 5/066; A01C 5/06; A01C 5/00; A01C 7/06; A01C 7/00; A01C 7/08
See application file for complete search history.

(56) References Cited

U.S. PATENT DOCUMENTS

| | | |
|---|---|---|
| 6,082,274 A | 7/2000 | Peter |
| 6,666,156 B1 | 12/2003 | Mayerle et al. |
| 7,451,711 B1 | 11/2008 | Wollmann |
| 7,497,174 B2 | 3/2009 | Sauder et al. |
| 9,565,797 B2 * | 2/2017 | Peter ................... A01C 7/08 |
| 9,908,222 B2 * | 3/2018 | Peter ................... B25B 27/02 |

FOREIGN PATENT DOCUMENTS

| | | |
|---|---|---|
| CA | 2420488 | 2/2004 |
| CA | 2576553 | 10/2007 |

OTHER PUBLICATIONS

European Patent Office, Supplementary European Search Report, dated Mar. 28, 2017 (PCT/US2013/056785).

* cited by examiner

*Primary Examiner* — Christopher J. Novosad
(74) *Attorney, Agent, or Firm* — Kevin R. Erdman; Brannon Sowers & Cracraft PC

(57) ABSTRACT

The present invention involves a seed firmer with a pusher attachment that extends the life of the seed firmer.

24 Claims, 13 Drawing Sheets

SEED FIRMER LIFE EXTENDER

CROSS-REFERENCE TO RELATED APPLICATIONS

The present application is a Divisional of U.S. patent application Ser. No. 14/012,246, filed Nov. 4, 2013, which claims priority under 35 U.S.C. § 119(e) of U.S. Patent Provisional Application Ser. No. 61/642,004, filed May 3, 2012, and is a continuation-in-part of co-pending U.S. patent application Ser. No. 13/862,698, filed Apr. 15, 2013, the disclosures of which are incorporated by reference herein.

BACKGROUND OF THE INVENTION

Field of the Invention

The invention relates to agricultural planting implements. More specifically, the field of the invention is that of seed firmers.

Description of the Related Art

Seed firmers are known and used extensively in agricultural planting systems. Such firmers add to the expense of a planting implement but are thought to more than pay for themselves in terms of increased yield. U.S. Pat. No. 5,425,318 describes one type of seed firmer; U.S. Pat. Nos. 5,730,074, 5,852,982, 6,082,274, and 6,220,191 describe seed firmers having liquid dispensing arrangements; and U.S. Pat. No. 7,497,174 describes a mounting system for seed firmers, the disclosures of all those noted U.S. Patents are explicitly incorporated by reference herein. Improvements in the cost and performance of the firmer are always welcomed.

SUMMARY OF THE INVENTION

The present invention is a seed firmer construction which provides a replaceable tip or end for extending the life of the firmer. The seed firmer generally has two components that degrade with use, the flexible arm and the embedding pusher. The flexible arm generally lasts much longer than the embedding pusher portion because the pusher wears against the ground and eventually wears away. Embodiments of the invention include an embedding pusher portion that has a stop and a guide for accepting a replaceable extender. Other embodiments include an embedding pusher portion that engages the rest of the firmer arm. Thus, the portion of the firmer that wears down may be easily replaced which extends the life of the firmer, multiple times over the useful life of the flexible arm.

In one embodiment, the end of the firmer has a slot that is bounded by a stop portion. The embedding pusher attachment slides into the slot and abuts the stop portion. The bottom of the embedding pusher operates in a conventional manner pushing the seed downwardly into the ground to thus embed the seed in the soil. During the usable life of the firmer, the flexible portion may operate on several embedding pusher attachments. In another embodiment, the embedding end is attached to the flexible arm, with the pusher attachment detactably extending from the embedding arm. In further embodiment, the arm of the attachment portion of the firmer has a connecting portion that attaches to a replaceable embedding element.

The embodiments of the firmer of the present invention optionally provide a passageway for fluid to be dispensed proximate the end of the firmer. The end of the passageway includes a directional attachment that directs fluid in relation to the end of the firmer. Other embodiments attach to the planting system either by connection to the seed tube, or connection to a mounting bracket on the planter. A further embodiment includes a delivery tube deployed within the walls of the embedding portion, with the end cap of the tube providing alternative passageways for the dispensing of liquid.

In one embodiment, the embedding arm has a width that expands from the width of about a seed at the bottom to double or triple width at the top. This narrowing of the embedding arm provides sufficient structure to support the constant interaction with the soil as the firmer is pulled through rows of plants. The thicker portion of the embedding arm provides sufficient width for the optional liquid delivery pipe or tube.

Many embodiments include an aperture at the end proximate where the seed is embedded. In one embodiment, a plug is used at that end. The plug may include an overhang to protect the hole from accumulation of debris. In one embodiment, the plug may be drilled to create either a straight backward stream of exiting liquid, while in another embodiment the plug may have two or more holes to create several distinct streams of exiting liquid. Another embodiment has a single plug with a through bore for creating the straight backward stream of exiting liquid, with an additional cap with one or more holes that create other angled streams. The cap may be snap fit or otherwise attached over the plug.

The extender portion of the firmer may attach to the pusher portion of the firmer via a variety of physical and mechanical couplings. For example, a peg in hole coupling, a glue based coupling, and a sonic welded coupling are all possible implementations of the invention. In several embodiments, a tongue and groove arrangement is used to couple the extender and the pusher portions. In one embodiment, the extender has a T shaped projection on the surface interfacing with the pusher portion which has a corresponding T-shaped groove to accept the projection and couple the two pieces together. This allows the extender to slide into the groove until abutting the stop. In one further embodiment, the surfaces having the tongue and groove include a further mating bump and depression, arranged so that the engagement of the bump and depression deter further relative movement of the extender and pusher portions. Thus, in several embodiments, the extender may be slid into the groove and snap fit at a precise location.

While the extender is disposed on one end of the firmer, the flexible or pushing portion is disposed at the other end and is adapted to be mounted to the planter in alignment with the seed chute. In one embodiment, the mounting portion of the pushing portion has elements that interfit and complement elements on the seed chute so that the pusher portion is directly aligned with the seed chute. In another embodiment, the pushing portion has a flat mounting end that is configured for engagement with a mounting device for holding a flat flange.

Liquid delivery is provided by a tube and discharge path formed in the firmer. In one embodiment, the solid firmer has a passageway shaped to receive a pipe, in one embodiment a curved pipe. Once the firmer is first molded, the curved pipe is inserted while the firmer material is setting up. One end of the pipe is attached to a tube, typically a plastic tube, to receive liquid (e.g., water, fertilizer, herbicides, and/or insecticides) from a source. In one embodiment, that first end of the pipe has ridges or is gnarled or otherwise roughened to enhance the connection of the tube. The other side of the pipe faces a discharge area of the firmer. An internal channel leads to a discharge passage. In one embodiment, a central discharge passage is straight back of the firmer. In another embodiment, multiple passages are present to direct liquid discharge at an angle to the body of the firmer. In yet another embodiment, a cap may be placed over the central discharge passage to redirect the discharging liquid in various angles.

Other embodiments of the invention include a firmer defined by a pair of sidewalls. The sidewalls hold the liquid tube proximate the end of the firmer, and attach to the mounting end of the firmer. The extender is detachably connected to the sidewalls, and may thus be replaced when sufficiently worn without having to replace the other portions of the firmer.

In yet another embodiment, the mounting portion of the firmer includes the pushing arm, and the end of the pushing arm attaches to the extender/embedding portion of the firmer. The optional liquid pipe may be included in the extender/embedding portion, or may be optionally coupled to the extender/embedding portion.

The present invention, in one form, relates to a seed firmer having a flexible portion and an embedding pusher portion. The flexible portion biases the embedding pusher portion into the soil. The embedding pusher portion includes a slot for receiving an embedding pusher attachment, the stop bounded at the end by a stop portion which retains the embedding pusher attachment as it is drawn over the soil.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
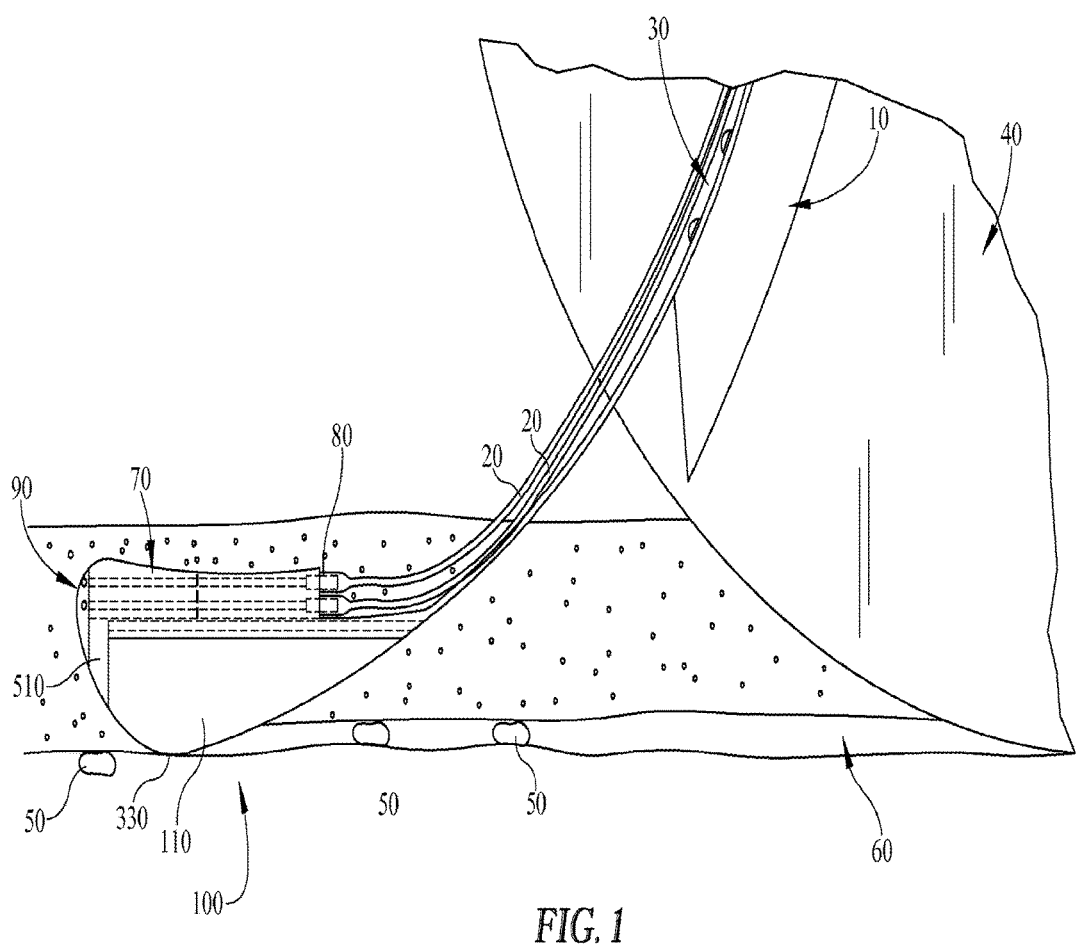
FIG. 1 is a side view of a first embodiment of the firmer of the present invention shown in use.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF EMBODIMENTS OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

FIG. 1 shows seed firmer 100 disposed in operation, having embedding pusher portion, or extender, 110 positioned relative to seed chute 10 in a conventional manner. Seed chute 10 is positioned relative to disc 40 by mount 30 so that chute 10 delivers seeds 50 to trough 60, with extender portion 110 being so positioned to embed seeds 50 into the soil of trough 60. Firmer 100 includes interior channel 70 which extends from nipples 80 to end point 90, and is sized to receive tube 20, which in this exemplary embodiment involves conventional liquid tubes that deliver herbicides, fertilizers, pesticides, and/or mixtures of those chemicals to deposit on or near seed 50 once embedded.

Figure 4:
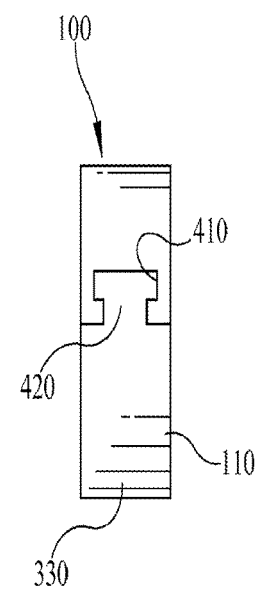
FIG. 4 is a side sectional view of the firmer of the first embodiment of the present invention showing the interconnection of the extender and firmer body.

Firmer 100 has an attachment portion, extender 110, that is located at a position on firmer 100 that contacts and embeds seeds 50 into the soil defining trough 60. In one embodiment, extender 110 fits into slot 410 in firmer 100 (see FIG. 4), with slot 410 bounded by hard stop portion 510 (see FIG. 5) that retains extender 110 against the direction of movement of firmer 100 over the soil. In this embodiment, extender 110 has tongue 420 having a "T" shape that slideably engages slot 410 so that when not in use, extender 110 may be easily replaced. When firmer 100 is in use, the force subjected to extender 110 urges it into hard stop 510. The exact shape and arrangement of the slideable engagement of slot 410 and tongue 420 may have several variations, for example a circular or arc shaped tongue and slot, or a tongue and slot with several angles.

Figure 3:
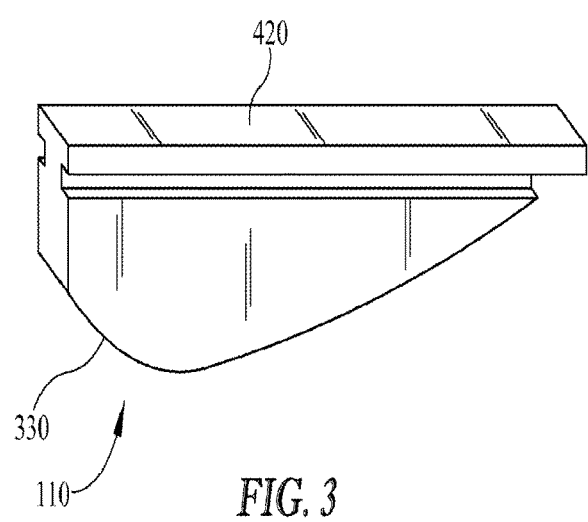
FIG. 3 is a perspective view of the first embodiment of the extender of the present invention.

Extender 110 (see FIG. 3) may be made of conventional materials so that seeds 50 are pressed by the conventional surface and the material wears similarly to conventional firmers. However, once embedding surface 330 wears away so as to diminish the capacity of firmer 100, extender 110 may be replaced. Replacement is made without removing firmer 100 from mount 30. Instead, a farmer may simply slide the old one of extender 110 and slide in a new one. Hard stop 510 limits the range of motion of extender 110, and when firmer 100 is drawn across trough 60 then extender 110 is pressed into hard stop 510.

Figure 2:
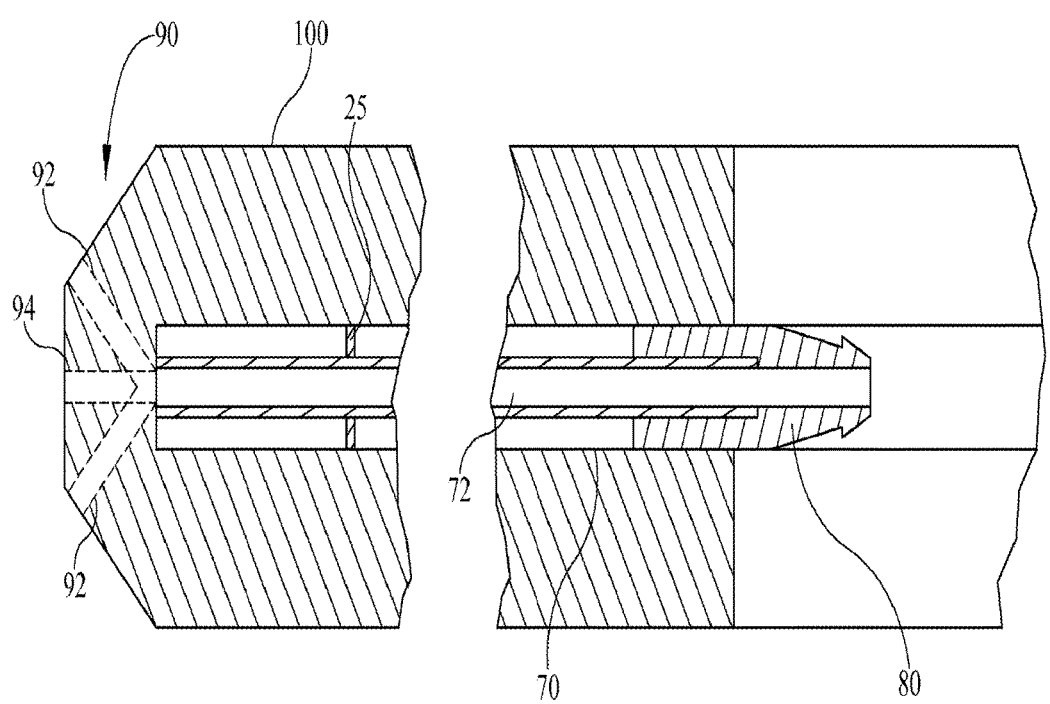
FIG. 2 is a sectional view of FIG. 1 showing a through channel.
Figure 5:
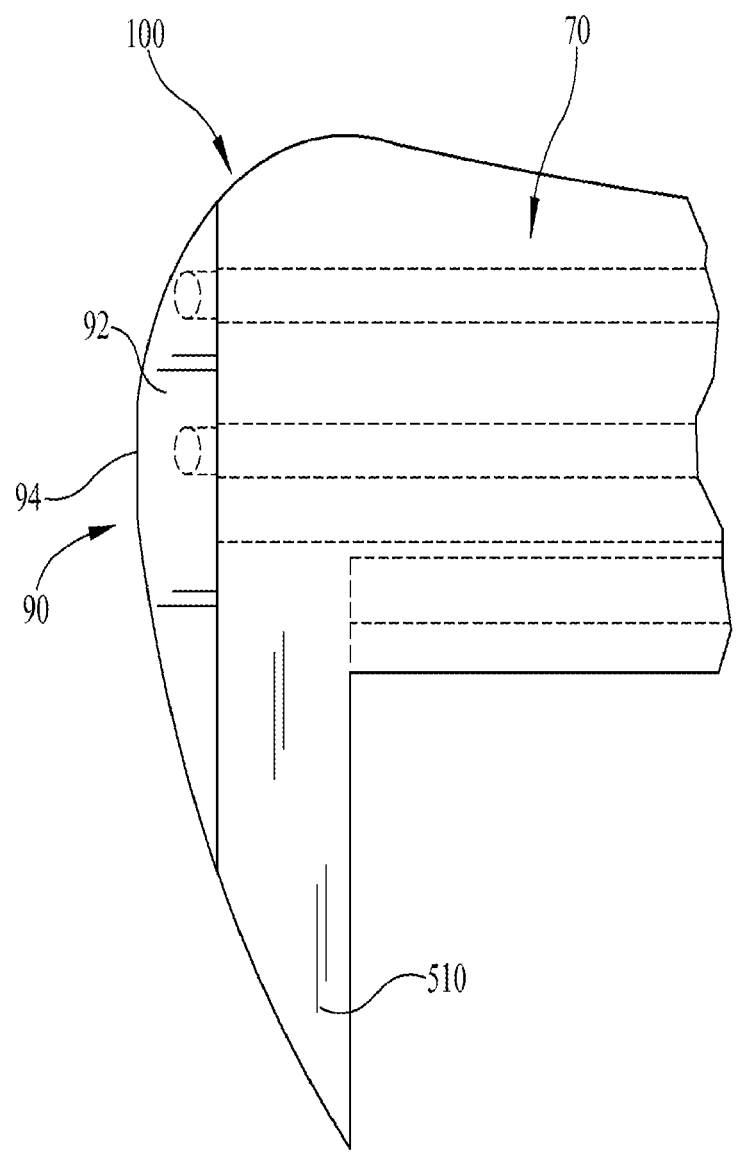
FIG. 5 is a perspective view of an end portion of the first embodiment of the present invention.

Firmer 100 also has an elongated interior channel 70 which is structured and arranged to receive tube 72, which in the disclosed embodiment is a convention liquid delivery tube, for delivering liquid on or near an embedded one of seeds 50 (see FIGS. 2 and 5). An open end of interior channel 70 is configured to receive nipple 80, which serves as a fluid connection between supply tube 20 and interior tube 72. Interior tube 72 is disposed within channel 70 and supported by tube holder 25, which in one embodiment includes a washer-shaped piece having a perimeter roughly congruent to the shape of interior channel 70.

End point 90 may be configured to be an outlet at one end of channel 70, with that end of channel 70 initially manufactured so that end point 90 closes one end of channel 70. This allows customization of a single piece, so that the exit holes may be drilled to suit the particular application. For example, a straight hole in facing surface 94 delivers liquid directly over embedded seed 50 (a "straight shooter"), which may be good for an insecticide, while side surfaces 92 may have holes drilled in them so that liquid is delivered on each side of embedded seed 50 (a "split shooter"), which may be better for fertilizer. In one embodiment (not shown), channel 70 is structured and arranged to accommodate multiple tube so that a series of end points are associated with each tube, allowing for combinations of straight shooters and split shooters in a single seed firmer.

Figure 6:
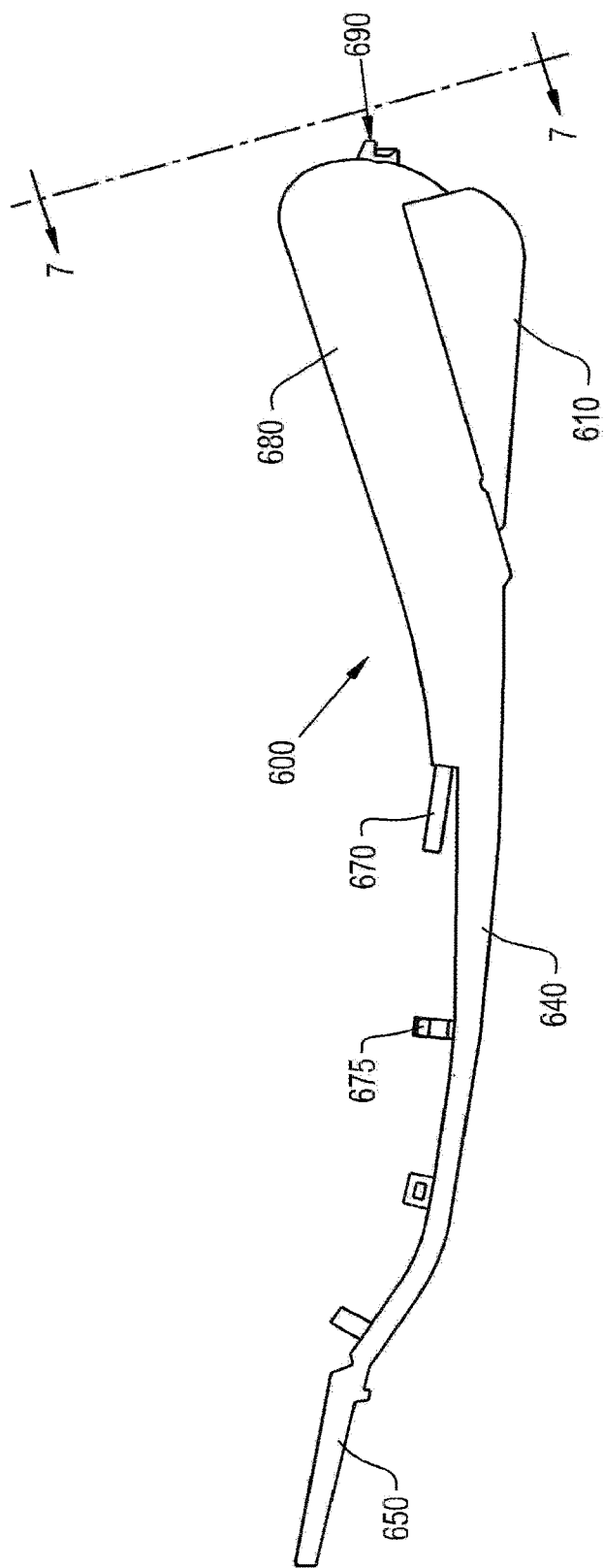
FIG. 6 is a perspective view of a second embodiment of the present invention.
Figure 9:
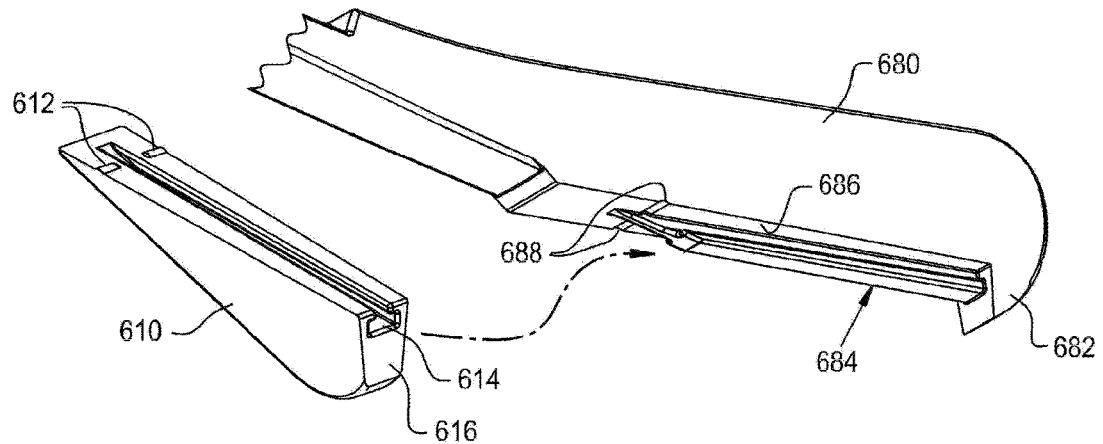
FIG. 9 is an enlarged view of the interconnection of the extender and the firmer body of the second embodiment of the present invention.
Figure 10:
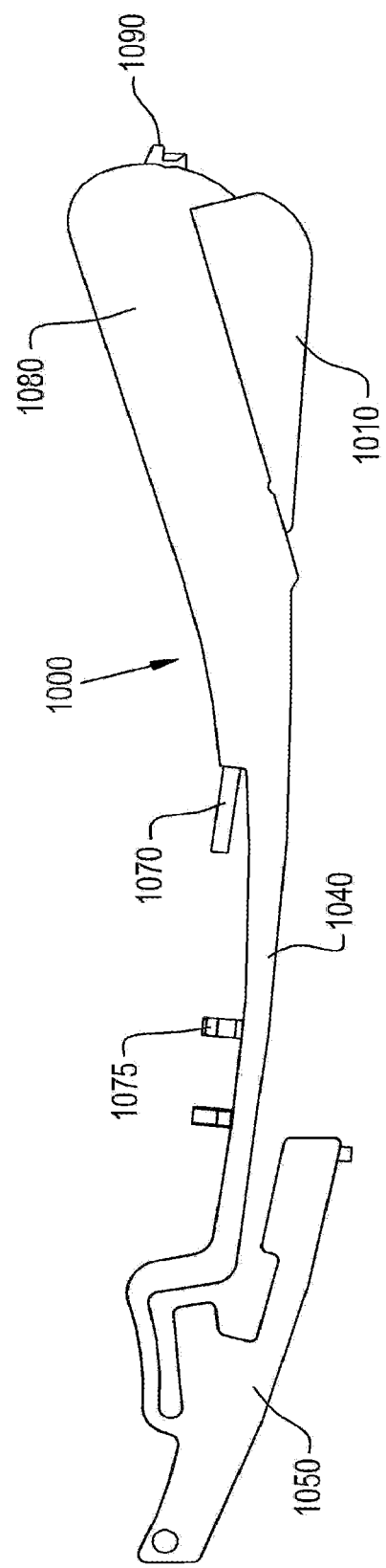
FIG. 10 is a perspective view of a third embodiment of the present invention.

Other embodiments have a tube disposed within the body of the firmer, for example the embodiments of FIGS. 6 and 10. The embodiment of FIG. 6 has flexing portion 640 coupling flat end 650 and embedding arm 680. Pipe 670 extends from embedding portion 680 and extends within portion 680 to spray nozzle 690. Pipe 670 is structured and arranged to receive a flexible tube (not shown) over its exposed end, and may have a roughed, serrated, or ridged surface to further engage the flexible tube. Firmer 600 may also have one or more tube retention pieces 675 to retain the flexible tube with firmer 600. Extender 610 engages embedding arm 680 as shown in FIG. 9 and described below. The embodiment of FIG. 10 has flexing portion 1040 coupling chute end 1050 and embedding arm 1080. Pipe 1070 extends from embedding portion 1080 and extends within portion 1080 to spray nozzle 1090. Pipe 1070 is structured and arranged to receive a flexible tube (not shown) over its exposed end, and may have a roughed, serrated, or ridged surface to further engage the flexible tube. Firmer 1000 may also have one or more tube retention pieces 1075 to retain the flexible tube with firmer 1000. Extender 1010 engages embedding arm 1080 as shown in FIG. 9 and described below.

Embodiments of the inventive firmers of the present application may be mounted on the planting equipment in a variety of ways. In one embodiment, as shown in FIG. 10, firmer 1000 includes seed chute connection portion 1050 structured and arranged to be connected to the exterior mounting of a seed chute (not shown). In another embodiment, shown in FIG. 6, firmer 600 has flat end 650 so that firmer 600 may be attached within a planter bracket assembly similar to that disclosed in the aforementioned U.S. Pat. No. 7,497,174. Embodiments disclosed in the present application may be adapted to either mounting style.

Figure 7:
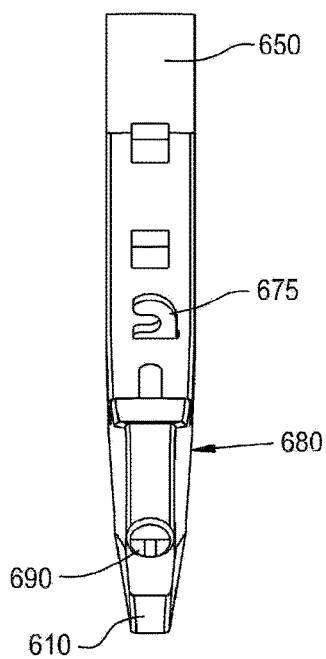
FIG. 7 is an enlarged view of the liquid dispensing end of the second embodiment of the present invention.

In addition to the alternative styles of mounting to a seed chute (not shown), embodiments of the invention also have alternative arrangements of the replaceable embedding portion of the firmer. FIG. 6 shows firmer 600 having embedding end 680 with spray nozzle 690 and extender 610. Firmer also has flat end 650 merging into flexible arm 640 which resiliently biases embedding end 680. Liquid, such as pesticide, herbicide, and/or fertilizer, may be directed proximate embedding end 680 by a flexible tube (not shown) being engaged with arm 675 and attaching to fixed tube 670. Fixed tube 670 extends through embedding end 680 to nozzle 690. FIG. 7 shows a view of embedding end 680 from the perspective of the trailing embedded seed. Extender 610 is the portion of firmer 600 pushing a seed (not shown in FIG. 7) into the ground. In this embodiment, embedding end 680 generally narrows to the general size of the seed, with nozzle 690 extending over the location of the embedded seed.

Figure 8A:
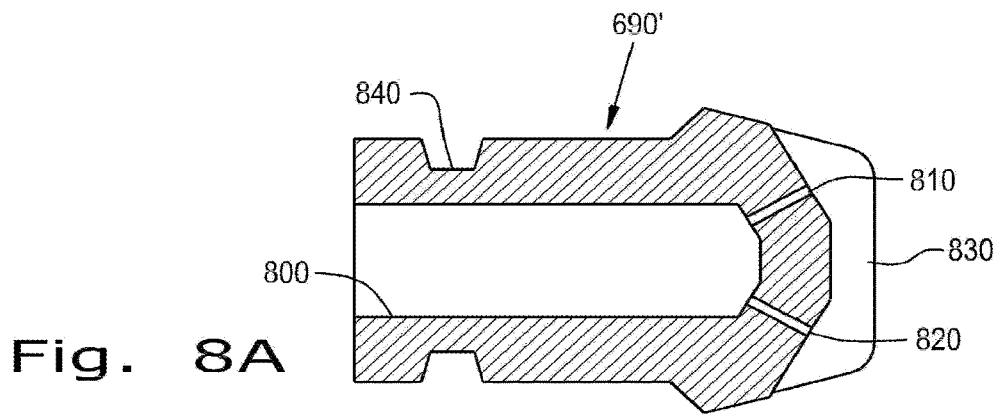
FIGS. 8A, 8B, and 8C are cross-sectional views of three embodiments of a liquid dispensing plug according to the present invention.
Figure 8B:
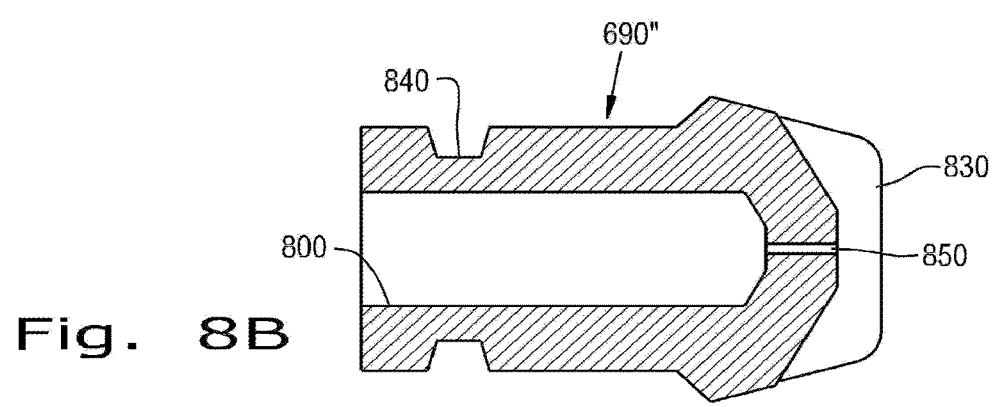
Figure 8C:
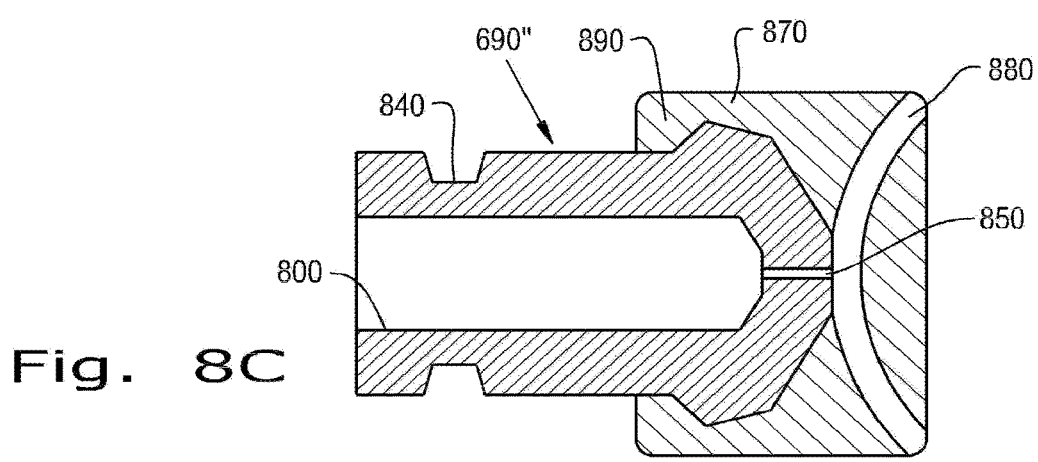

Firmer 600 may have alternative versions of nozzle 690. In the alternative embodiment of FIG. 8A, central bore 800 extends through cylindrically shaped nozzle 690' and terminates at angled passages 810 and 820, which are structured and arranged to direct liquid to a position offset from the seed. Flange 830 extends outward to shield the space through which angled passages 810 and 820 direct fluid. Valley 840 is located proximate the open end of central bore 800, and is structured and arranged to be engaged by a ridge or bump within embedding end 680 to secure the position of nozzle 690'. The alternative embodiment of FIG. 8B has central passage 850 for directing fluid onto the seed. A further alternative embodiment is shown in FIG. 8C, which includes splitter 692 that attaches over nozzle 690' so that fluid coming through central passage 850 is directed in other directions through splitter holes 694, for example with similar angles as passages 810 and 820 of the embodiment of FIG. 8A. The exact shape, size, and angle of splitter holes 694 may be varied for several unillustrated alternative embodiments of splitter 692.

In the embodiment of FIG. 6, extender 610 engages embedding end 680. One embodiment of the connection of extender 10 and embedding end 680 is depicted in the arrangement of FIG. 9. In this arrangement, embedding end 680 has T-shaped tongue 684 extending from stop portion 682 and below bottom surface 686. Tongue 684 is structured and arranged to match the contour of recess 614 of extender 610. Near the end of tongue 684 opposite stop 682, bottom surface 686 has a recess portion 688. Recess portion 688 is structured and arranged to engage with ribs 612 which extend from extender 610. The engagement of ribs 612 with recess portion 688 allows extender 610 to be slid onto tongue 684 without any impediment, and when stop end 616 of extender 610 nears stop portion 682, then ribs 612 are close to engagement with recess portion 688 and thus provides a slide in and lock procedure for securing extender 610 with embedding end 680.

Figure 11:
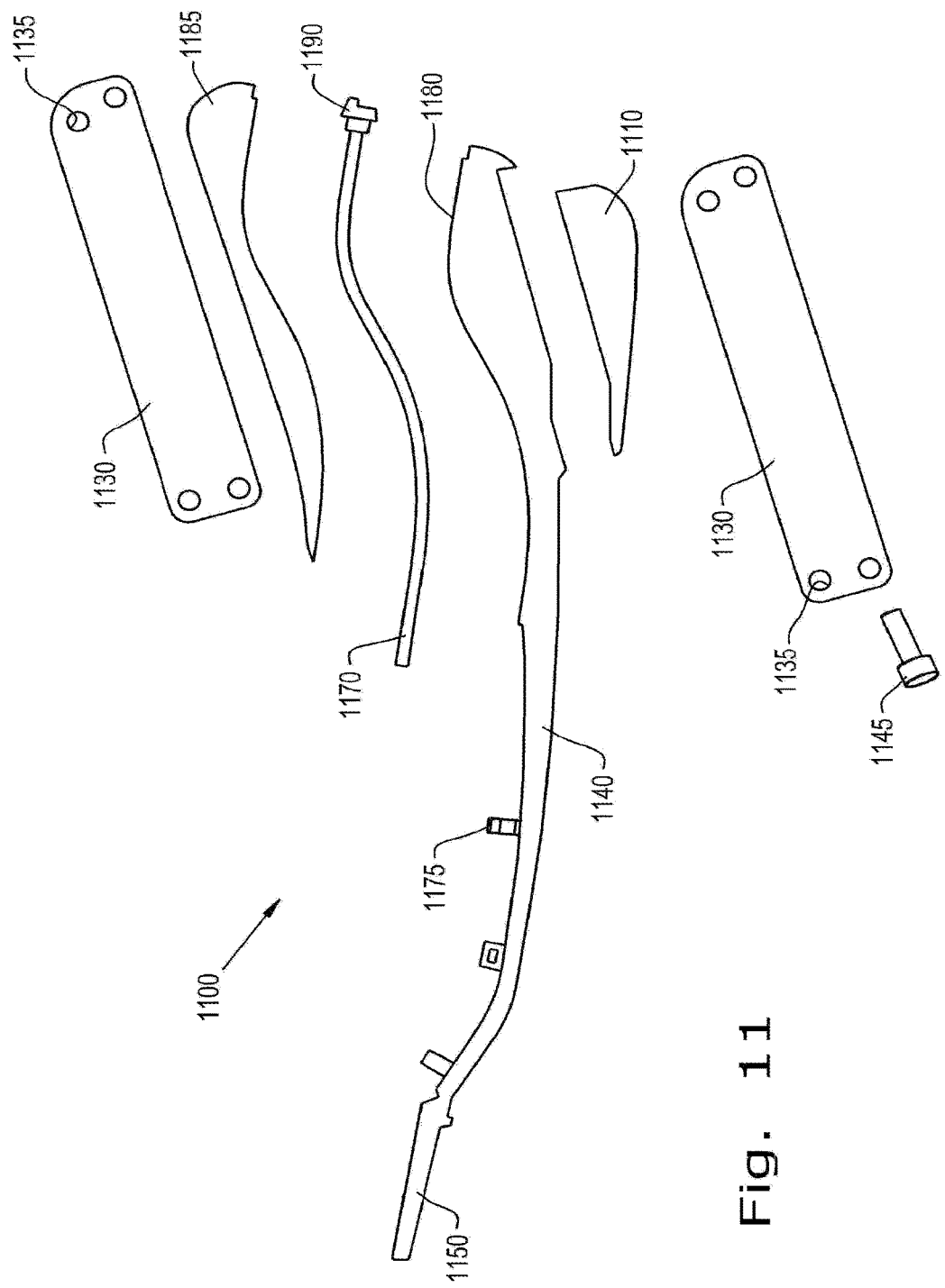
FIG. 11 is an exploded view of a fourth embodiment of the present invention.
Figure 12:
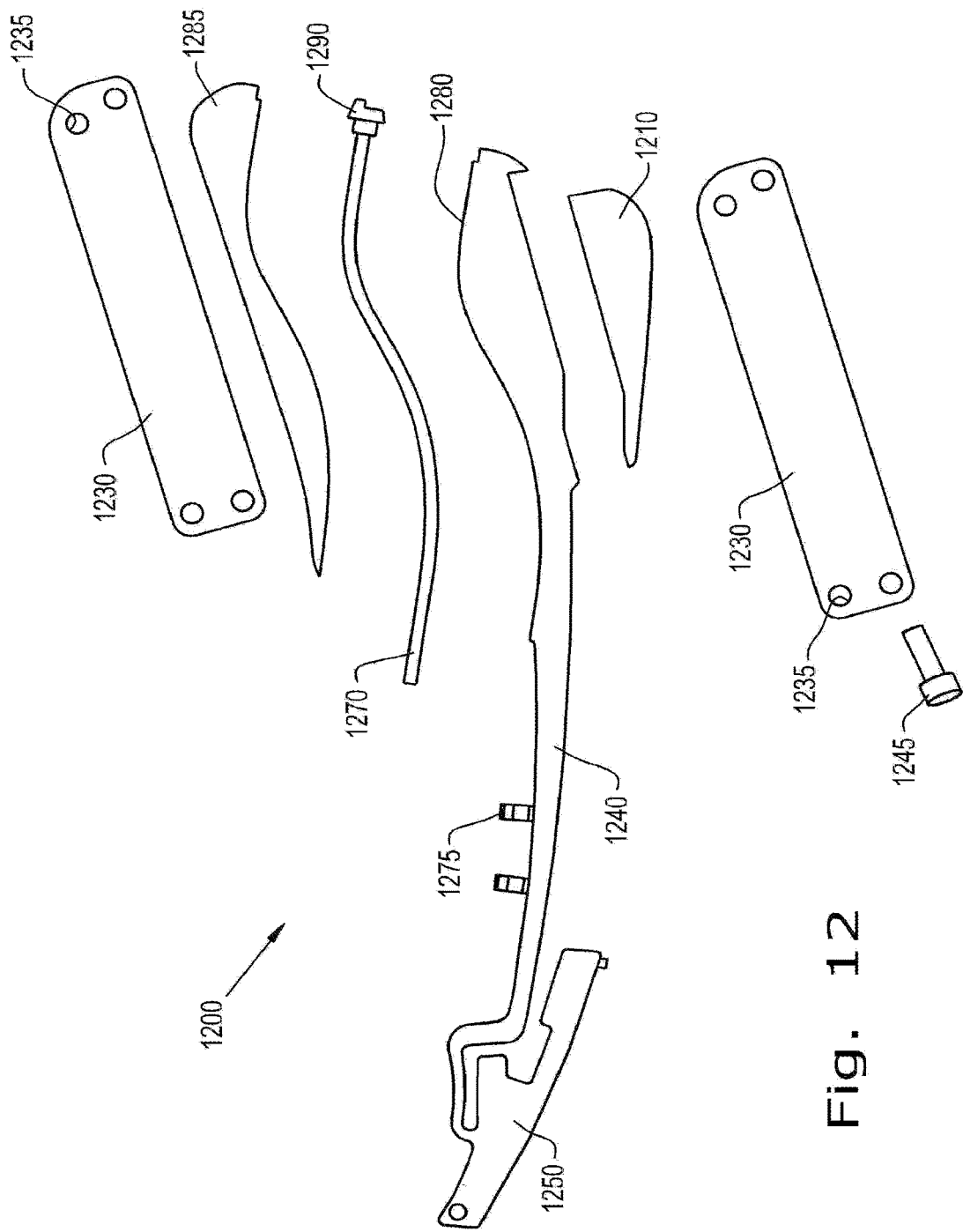
FIG. 12 is an exploded view of a fifth embodiment of the present invention.

Other embodiments of the invention involve the firmer having a central portion with attachment, flexing, and embedding portions connected together by a sandwiching arrangement between corresponding sidewalls, for example the embodiments of FIGS. 11 and 12. In the embodiment of FIG. 11, firmer 1100 has flat end 1150, central portion 1140, and embedding end 1180 formed in one integral piece. Pipe 1170 is disposed over embedding portion 1180, and under upper portion 1185, with extender 1110 abutting embedding portion 1180. Sidewalls 130 sandwich those components, and in some embodiments hold all together, using connectors 1145 received in sidewall holes 1135. In other unillustrated embodiments, extender 1110 may have a tongue-groove connection with embedding portion 1180, and be independent of, or alternatively sandwiched between, sidewalls 1130. Connectors 1145, which may be in the form of a screw, rod, putty, or other piece of connecting material and combinations of those, may secure sidewalls 1130 as sandwiching plates holding other components in their desired positions. In some embodiments, one or more connectors 1145 are releasable or otherwise alterable, while in other embodiments all connectors 1145 are fixed and engage sidewalls 1130, including extending through other components of firmer 1100. The embodiment of FIG. 12 has similar features to that of FIG. 11, with the exception that chute end 1250 being structured and arranged for connection to a conventional seed chute (not shown).

Figure 13:
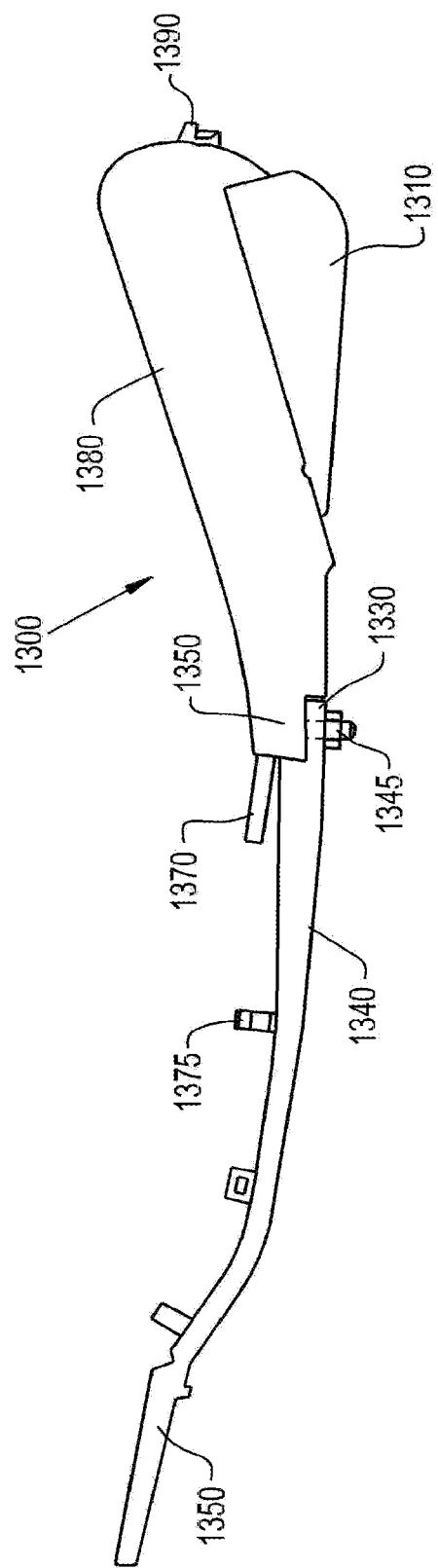
FIG. 13 is a side view of a sixth embodiment of the present invention.

A further embodiment having separate attaching and embedding portions is shown in FIG. 13. In this embodiment, flexible portion 1340 and flat end 1350 (which could in another embodiment be replaced by a chute end, not shown here) are formed as a single integral piece, and embedding arm 1380 is formed as a separate piece. In this embodiment, pipe 1370 extends from connection portion 1350 to spray nozzle 1390, and the bottom of connection portion 1350 abuts flange 1330 of flexible portion 1340. Extender 1310 is connected to embedding arm 1380 with a tongue and groove connection similar to some previous embodiments. Connector 1345, which may be in the form of a screw, rod, putty, or other piece of connecting material, extends through flange 1330 to couple with connection portion 1350. In alternative embodiments (not shown), pipe 1370 may enter embedding arm 1380 above the overlap with flexible portion 1340 so that connector 1345 in that embodiment is affixed from the top.

Figure 14:
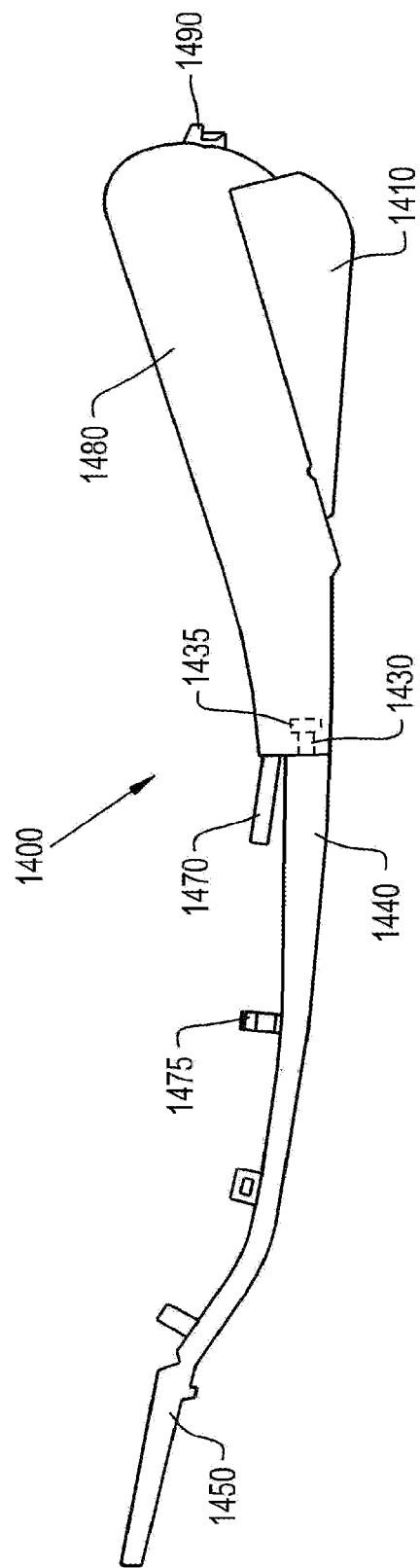
FIG. 14 is a side view of a seventh embodiment of the present invention.

Another embodiment shown in FIG. 14 has a two piece design for firmer 1400, with flexible portion 1440 having connection portion 1430 inserted into receiving portion 1435 or embedding portion 1480. In this embodiment, flat end 1450 may be alternatively shaped as a chute portion (not shown), and extender 1410 may be attached to embedding portion 1480 by a tongue and groove connection, or other connection.

Figure 15:
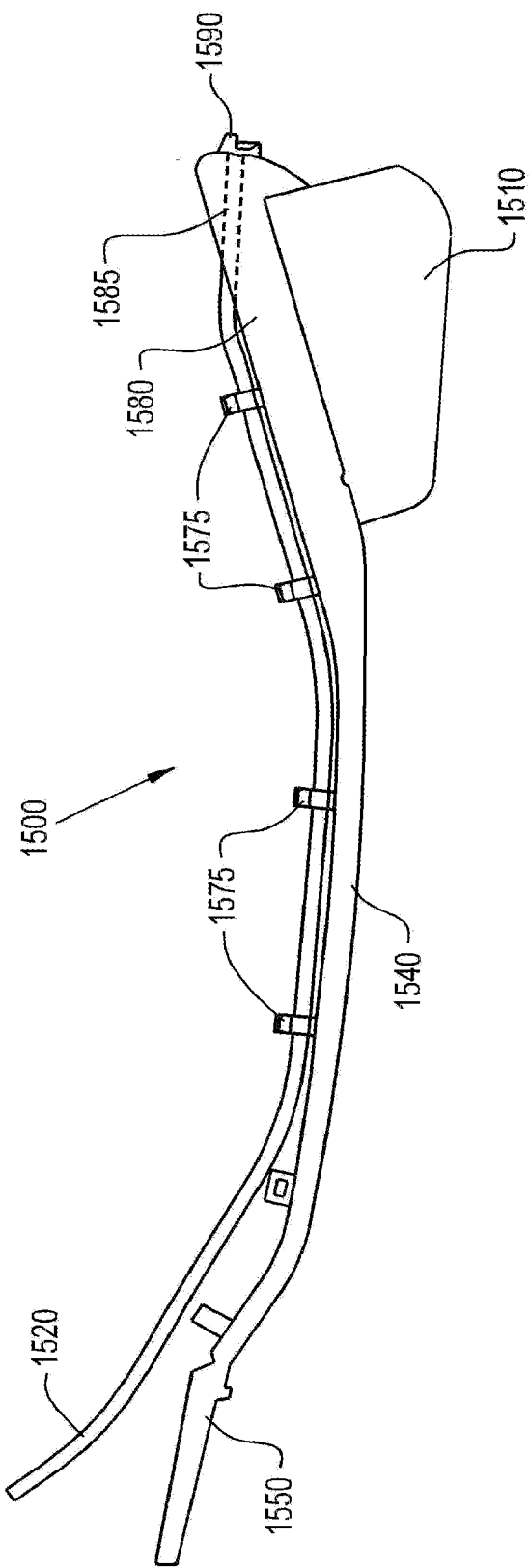
FIG. 15 is a side view of a eighth embodiment of the present invention.

An additional embodiment having a less substantial embedding portion is shown as firmer 1500 in FIG. 15. In this embodiment, flat end 1550 (which may alternatively be a chute end, not shown) has tube brackets 1575 disposed along flexible portion 1540 and embedding portion 1580 to provide for holding a tube (not shown) along the upper body of firmer 1500 to dispensing passage 1585 and spray nozzle 1590. Extender 1510, in this embodiment, may be attached to embedding portion 1580 via a tongue and groove connection, and is substantially thicker than those of the previous embodiments. This arrangement maximizes the size of replaceable extender 1510. Because of the greater size of extender 1510, the size of embedding portion 1580 is reduced. Thus, a pipe may not be feasible within embedding portion 1580, rather provision is made for attachment to flexible tube 1520. Flexible tube 1520 may be connected to a liquid delivery system (not shown) for dispensing water, nutrients, pesticides, and/or herbicides.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seed firmer for embedding seeds into soil, said seed firmer comprising:
    a flexible arm portion adapted to be attached to a seed chute of a planter;
    a firming arm flexibly connected to said flexible arm portion, said firming arm including a slot bounded at one end by a stop, said firming arm further including a through passage;
    a tube extending within said through passage;
    a tip having a dispensing passageway, said tip connected to an end of said tube at said firming arm; and
    an extender attachment extending into said slot and abutting said stop.

2. The seed firmer of claim 1 wherein said flexible portion and said firming arm are formed as an integral piece.

3. The seed firmer of claim 1 wherein said firming arm narrows towards said extender attachment.

4. The seed firmer of claim 1 wherein one of said extender attachment and said firming arm has a slot, and the other of said extender attachment and said firming arm has a tongue, said slot structured and arranged to accommodate said tongue.

5. The seed firmer of claim 4 wherein said tongue and said slot have a T shape.

6. The seed firmer of claim 4 wherein one of said extender attachment and said firming arm has a ridge, and the other of said extender attachment and said firming arm has a depression, said ridge structured and arranged to form an interference fit.

7. The seed firmer of claim 1 further comprising a pair of side walls, said pair of side walls sandwiching said flexible portion and said firming arm.

8. The seed firmer of claim 1 wherein the extender attachment has a greater thickness than the flexible arm portion.

9. The seed firmer of claim 1 wherein the extender attachment has a bottom which narrows in comparison to the firming arm.

10. The seed firmer of claim 1 further comprising a tube for conveying liquid, said tube positioned on the flexible arm portion and disposed above an end of the extender attachment.

11. The seed firmer of claim 10 further comprising a tip having a dispensing passageway, the tip connected to an end of the tube on the flexible arm portion.

12. A seed firmer for embedding seeds into soil, said seed firmer comprising:
    a flexible arm portion adapted to be attached to a seed chute of a planter;
    a firming arm flexibly connected to said flexible arm portion, said firming arm including a slot bounded at one end by a stop; and
    an extender attachment extending into said slot and abutting said stop
    wherein one of said extender attachment and said firming arm has a slot, and the other of said extender attachment and said firming arm has a tongue, said slot structured and arranged to accommodate said tongue, and said tongue and said slot have a T shape.

13. The seed firmer of claim 12 wherein said flexible portion and said firming arm are formed as an integral piece.

14. The seed firmer of claim 12 wherein said firming arm narrows towards said extender attachment.

15. The seed firmer of claim 12 wherein said firming arm includes a through passage.

16. The seed firmer of claim 15 further comprising a tube extending within said through passage.

17. The seed firmer of claim 16 further comprising a tip having a dispensing passageway, said tip connected to an end of said tube at said firming arm.

18. The seed firmer of claim 12 wherein one of said extender attachment and said firming arm has a ridge, and the other of said extender attachment and said firming arm has a depression, said ridge structured and arranged to form an interference fit.

19. The seed firmer of claim 12 further comprising a pair of side walls, said pair of side walls sandwiching said flexible portion and said firming arm.

20. The seed firmer of claim 12 wherein the extender attachment has a greater thickness than the flexible arm portion.

21. The seed firmer of claim 12 wherein the extender attachment has a bottom which narrows in comparison to the firming arm.

22. The seed firmer of claim 12 further comprising a tube for conveying liquid, said tube positioned on the flexible arm portion and disposed above an end of the extender attachment.

23. The seed firmer of claim 22 further comprising a tip having a dispensing passageway, the tip connected to an end of the tube on the flexible arm portion.

24. A seed firmer for embedding seeds into soil, said seed firmer comprising:
- a flexible arm portion adapted to be attached to a seed chute of a planter;
- a firming arm flexibly connected to said flexible arm portion, said firming arm including a slot bounded at one end by a stop;
- a pair of side walls, said pair of side walls sandwiching said flexible portion and said firming arm; and
- an extender attachment extending into said slot and abutting said stop.

* * * * *